US008207959B2

(12) United States Patent
Yasuda

(10) Patent No.: US 8,207,959 B2
(45) Date of Patent: Jun. 26, 2012

(54) DISPLAY DEVICE

(75) Inventor: Kozo Yasuda, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 355 days.

(21) Appl. No.: 12/566,804

(22) Filed: Sep. 25, 2009

(65) Prior Publication Data

US 2010/0079435 A1 Apr. 1, 2010

(30) Foreign Application Priority Data

Sep. 26, 2008 (JP) ................................ 2008-247042

(51) Int. Cl.
*G06F 3/038* (2006.01)
*G09G 5/00* (2006.01)

(52) U.S. Cl. ...................................................... 345/211

(58) Field of Classification Search .................. 345/211, 345/212, 213, 100, 204, 95, 94, 89, 690
See application file for complete search history.

(56) References Cited

U.S. PATENT DOCUMENTS

| | | | | |
|---|---|---|---|---|
| 5,021,774 | A * | 6/1991 | Ohwada et al. | 345/90 |
| 6,151,005 | A * | 11/2000 | Takita et al. | 345/89 |
| 6,937,222 | B2 * | 8/2005 | Numao | 345/98 |
| 7,034,816 | B2 * | 4/2006 | Yatabe | 345/213 |
| 7,084,848 | B2 * | 8/2006 | Senda et al. | 345/92 |
| 7,091,937 | B2 * | 8/2006 | Nakamura | 345/76 |
| 7,268,750 | B2 * | 9/2007 | Isono et al. | 345/75.1 |
| 7,327,341 | B2 * | 2/2008 | Toriumi et al. | 345/98 |
| 7,602,386 | B2 * | 10/2009 | Maekawa | 345/204 |
| 7,633,478 | B2 * | 12/2009 | Morita | 345/95 |
| 8,018,422 | B2 * | 9/2011 | Morita | 345/100 |
| 8,022,899 | B2 * | 9/2011 | Takahara | 345/76 |
| 2006/0007212 | A1 * | 1/2006 | Kimura et al. | 345/204 |
| 2008/0303765 | A1 * | 12/2008 | Nakatsuka | 345/87 |
| 2009/0109361 | A1 * | 4/2009 | Ishii | 349/39 |

FOREIGN PATENT DOCUMENTS

JP 2001-305510 10/2001

* cited by examiner

*Primary Examiner* — Fred Tzeng
(74) *Attorney, Agent, or Firm* — Antonelli, Terry, Stout & Kraus, LLP.

(57) ABSTRACT

The number of wirings between a scanning circuit and a plurality of scanning lines is decreased with a more simple circuit configuration than a conventional one. The scanning lines are grouped into kN× . . . ×k2 groups. First to Nth groups of gate wirings are included, each of the first to Nth groups being composed of kn (1≦n≦N) gate wirings. A scanning line drive circuit outputs a first selection scanning voltage which selects the scanning lines in each of the groups every horizontal scanning period to the first group of k1 gate wirings, outputs a second selection scanning voltage which selects the scanning lines in one of groups in a second stage where k2 groups constitute one unit every k1 horizontal scanning periods to the second group of k2 gate wirings, and outputs an mth selection scanning voltage which selects the scanning lines in one of groups in an mth stage where k (m−1) groups in a (m−1)th stage constitute one unit every (k (m−1)× . . . ×k1) horizontal scanning periods to an mth group of km gate wirings.

8 Claims, 8 Drawing Sheets

DISPLAY DEVICE

The present application claims priority from Japanese applications JP 2008-247042 filed on Sep. 26, 2008, the content of which is hereby incorporated by reference into this application.

BACKGROUND OF THE INVENTION

1. Field of the Invention

The present invention relates to a display device such as a liquid crystal display device or an EL display device and more particularly to a technique for effectively decreasing the number of wirings from a video line drive circuit or a scanning line drive circuit to a display panel.

2. Background Art

At present, liquid crystal display panels used for liquid crystal televisions or mobile phones are TFT type liquid crystal display devices.

FIG. 1 shows an equivalent circuit of a conventional TFT type active matrix liquid crystal display panel.

As shown in FIG. 1, the conventional liquid crystal display panel includes a plurality of scanning lines (also referred to as gate lines) (GL) arranged in parallel in the y-direction and extending in the x-direction and m video lines (also referred to as source lines or drain lines) (DL) arranged in parallel in the x-direction and extending in the y-direction on the surface on the liquid crystal side of one of a pair of substrates which are arranged to face each other via liquid crystal.

Regions surrounded by the scanning lines and the video lines constitute sub-pixel regions. In one of the sub-pixel regions, a thin film transistor (TFT) constituting an active element in which a gate thereof is connected to the scanning line, a drain (or source) thereof is connected to the video line, and a source (or drain) thereof is connected to a pixel electrode (PX) is provided.

Since liquid crystal is present between the pixel electrode (PX) and a counter electrode (CT), a liquid crystal capacitor (Clc) is formed between the pixel electrode (PX) and the counter electrode (CT). A holding capacitor (Cadd) is actually formed between the pixel electrode (PX) and the counter electrode (also referred to as common electrode) (CT). In FIG. 1, however, the holding capacitor (Cadd) is not illustrated.

Each of the scanning lines (GL) is connected to a vertical scanning circuit (also referred to as gate driver) (XDV). The vertical scanning circuit (XDV) sequentially supplies a selection scanning signal to each of the scanning lines (GL). Each of the video lines (DL) is connected to a horizontal scanning circuit (also referred to as source driver or drain driver) (YDV). The horizontal scanning circuit (YDV) outputs a video voltage of R, G, or B (so-called gray scale voltage) to each of the video lines (DL) during 1 horizontal scanning period.

A thin film transistor (TFT) using an amorphous silicon layer for a semiconductor layer (hereinafter referred to as a-Si thin film transistor) and a thin film transistor (TFT) using a polysilicon layer for a semiconductor layer (hereinafter referred to as poly-Si thin film transistor) have been known. Further, in recent years, a thin film transistor (TFT) using a microcrystalline silicon layer for a semiconductor layer (hereinafter referred to as microcrystalline thin film transistor) has also been known. The microcrystalline thin film transistor offers performance about intermediate between the a-Si thin film transistor and the poly-Si thin film transistor.

In general, while liquid crystal display panels for liquid crystal televisions use the a-Si thin film transistors as active elements, liquid crystal display panels for mobile phones use the poly-Si thin film transistors as active elements.

The operation speed of the poly-Si thin film transistor is about one digit higher than that of the a-Si thin film transistor. Therefore, in the liquid crystal display panel using the poly-Si thin film transistor as an active element, the vertical scanning circuit (XDV) is configured with the poly-Si thin film transistor, and the vertical scanning circuit (XDV) is formed on the surface on the liquid crystal side of one of a pair of substrates which constitute the liquid crystal display panel.

Since the operation speed of the a-Si thin film transistor or the microcrystalline thin film transistor is lower than that of the poly-Si thin film transistor, the vertical scanning circuit (XDV) formed of the a-Si thin film transistor cannot be formed inside a liquid crystal display panel. Therefore, in the liquid crystal display panel using the a-Si thin film transistor or the microcrystalline thin film transistor as an active element, a semiconductor chip having the vertical scanning circuit (XDV) installed thereon is mounted on one of a pair of substrates which constitute the liquid crystal display panel, for example.

Examples of the related art document relating to the invention include JP-A-2001-305510.

SUMMARY OF THE INVENTION

In general, as methods for mounting semiconductor chips constituting the vertical scanning circuit (XDV) and the horizontal scanning circuit (YDV), the following two methods have been known: one of them is to separately mount a semiconductor chip constituting the vertical scanning circuit (XDV) and a semiconductor chip constituting the horizontal scanning circuit (YDV) on one of a pair of substrates which are arranged to face each other via liquid crystal as shown in FIG. 1; and the other is to mount a semiconductor chip constituting a scanning circuit (RDV) in which the vertical scanning circuit (XDV) and the horizontal scanning circuit (YDV) are integrated on one of a pair of substrates which are arranged to face each other via liquid crystal as shown in FIG. 2.

In either of the methods, gate wirings which connect the vertical scanning circuit (XDV) (or the scanning circuit (RDV)) with each of the scanning lines (GL) are required as many as the number of the scanning lines (GL) in order to supply a selection scanning voltage from the vertical scanning circuit (XDV) (or the scanning circuit (RDV)) to each of the scanning lines (GL).

In FIGS. 1 and 2, VSYNC denotes a vertical synchronizing signal, HSYNC denotes a horizontal synchronizing signal, CK denotes a dot clock, and Data denotes video data.

However, in a small panel such as a liquid crystal display panel for mobile phone, it is conceivable that the gate wirings cannot be wired inside the liquid crystal display panel when the number of pixels is increased due to an increase in definition.

JP-A-2001-305510 describes that an n-bit address decoder circuit is used for the vertical scanning circuit (XDV) in order to solve the above problem. However, the n-bit address decoder circuit described in JP-A-2001-305510 has problems that the circuit configuration is complicated, and that the number of transistors used is great.

The invention has been made to solve the above problems in the related art, and it is an object of the invention to provide a technique capable of decreasing the number of wirings between a scanning circuit and a plurality of scanning lines with a more simple circuit configuration than a conventional one in a display device.

The above and other objects and novel features of the invention will be apparent from the following detailed description of the invention and the accompanying drawings.

Typical outlines of the invention disclosed herein will be briefly described below.

(1) A display device includes: a plurality of pixels; a plurality of scanning lines which input a scanning voltage to the plurality of pixels; and a scanning line drive circuit which supplies the plurality of scanning lines with the scanning voltage, wherein the scanning lines are grouped into kN× . . . ×k2 groups, N being an integer of 2 or more, the number of the scanning lines in each of the groups is up to k1, first to Nth groups of gate wirings are included, each of the first to Nth groups being composed of kn (1≦n≦N) gate wirings, and the scanning line drive circuit outputs a first selection scanning voltage which selects the scanning lines in each of the groups every horizontal scanning period to the first group of k1 gate wirings, outputs a second selection scanning voltage which selects the scanning lines in one of groups in a second stage where k2 groups constitute one unit every k1 horizontal scanning periods to the second group of k2 gate wirings, and outputs an mth selection scanning voltage which selects the scanning lines in one of groups in an mth stage where k(m−1) groups in a (m−1)th stage constitute one unit every (k(m−1)× . . . ×k1) horizontal scanning periods to an mth group of km gate wirings, m being an integer of 3 or more and N or less (3≦m≦N).

(2) In (1), the display device further includes a series circuit of (N−1) first to (N−1)th transistors, wherein one end of each of the scanning lines is connected to a second electrode of the (N−1)th transistor, a first electrode of the first transistor is connected to any one of the first group of gate wirings, and a control electrode of the j (1≦j≦N−1)th transistor is connected to anyone of the (j+1)th group of gate wirings.

(3) In (2), the display device further includes (N−1) Nth to (2N−2)th transistors each of which is connected between each of the scanning lines and a reference power source, wherein each of the second group of gate wirings to the Nth group of gate wirings includes kp (2≦p≦N) inverted gate wirings, the scanning line drive circuit outputs a pth inverted selection scanning voltage to a corresponding inverted gate wiring when outputting the pth selection scanning voltage, and a control electrode of the i (N≦i≦2N−2)th transistor is connected to any one of the (i+1)th group of inverted gate wirings.

(4) In (3), a difference between a maximum number and a minimum number in k1 and 2kp (2≦p≦N) is 3 or less.

(5) A display device includes: a plurality of pixels; a plurality of video lines which input a video voltage to the plurality of pixels; and a video line drive circuit which supplies the plurality of video lines with the video voltage, wherein the video lines are grouped into kN× . . . ×k2 groups, N being an integer of 2 or more, the number of the video lines in each of the groups is up to k1, first to Nth groups of source wirings are included, each of the first to Nth groups being composed of kn (1≦n≦N) source wirings, the video line drive circuit outputs a first selection scanning voltage which selects the video lines in each of the groups every dot clock to the first group of k1 source wirings, outputs a second selection scanning voltage which selects the video lines in one of groups in a second stage where k2 groups constitute one unit every k1 dot clocks to the second group of k2 source wirings, and outputs an mth selection scanning voltage which selects the video lines in one of group in an mth stage where k(m−1) groups in a (m−1)th stage constitute one unit every (k(m−1)× . . . ×k1) dot clocks to an mth group of km source wirings, m being an integer of 3 or more and N or less (3≦m≦N).

(6) In (5), one end of each of the video lines is supplied with a video voltage via a switching transistor, a series circuit of (N−1) first to (N−1)th transistors is included, a control electrode of each of the switching transistors is connected to a second electrode of the (N−1)th transistor, a first electrode of the first transistor is connected to any one of the first group of source wirings, and a control electrode of the j (1≦j≦N−1)th transistor is connected to any one of the (j+1)th group of source wirings.

(7) In (6), the display device further includes (N−1) Nth to (2N−2)th transistors each of which is connected between the control electrode of each of the switching transistors and a reference power source, wherein each of the second group of source wirings to Nth group of source wirings includes kp (2≦p≦N) inverted source wirings, the video line drive circuit outputs a pth inverted selection video voltage to a corresponding inverted source wiring when outputting the pth selection video voltage, and a control electrode of the i (N≦i≦2N−2)th transistor is connected to any one of the (i+1)th group of inverted source wirings.

(8) In (7), a difference between a maximum number and a minimum number in k1 and 2kp (2≦p≦N) is 3 or less.

A typical advantage provided by the invention disclosed herein will be briefly described below.

According to the display device of the invention, the number of wirings between a scanning circuit and a plurality of scanning lines can be decreased with a more simple circuit configuration than a conventional one.

DESCRIPTION OF THE PREFERRED EMBODIMENTS

Figure 1:
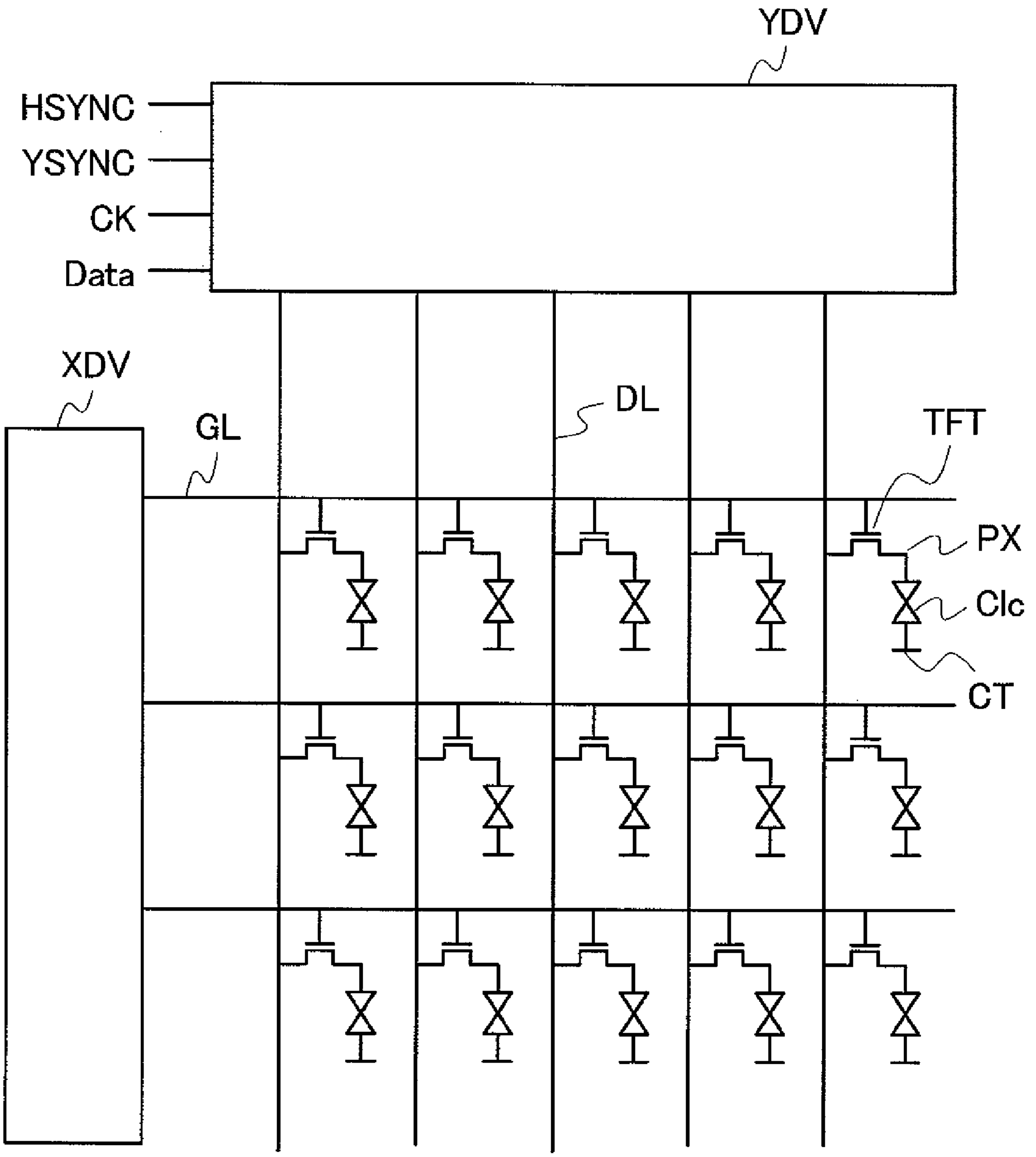
FIG. 1 PRIOR ART
FIG. 1 shows an equivalent circuit of a conventional TFT type active matrix liquid crystal display panel.
Figure 2:
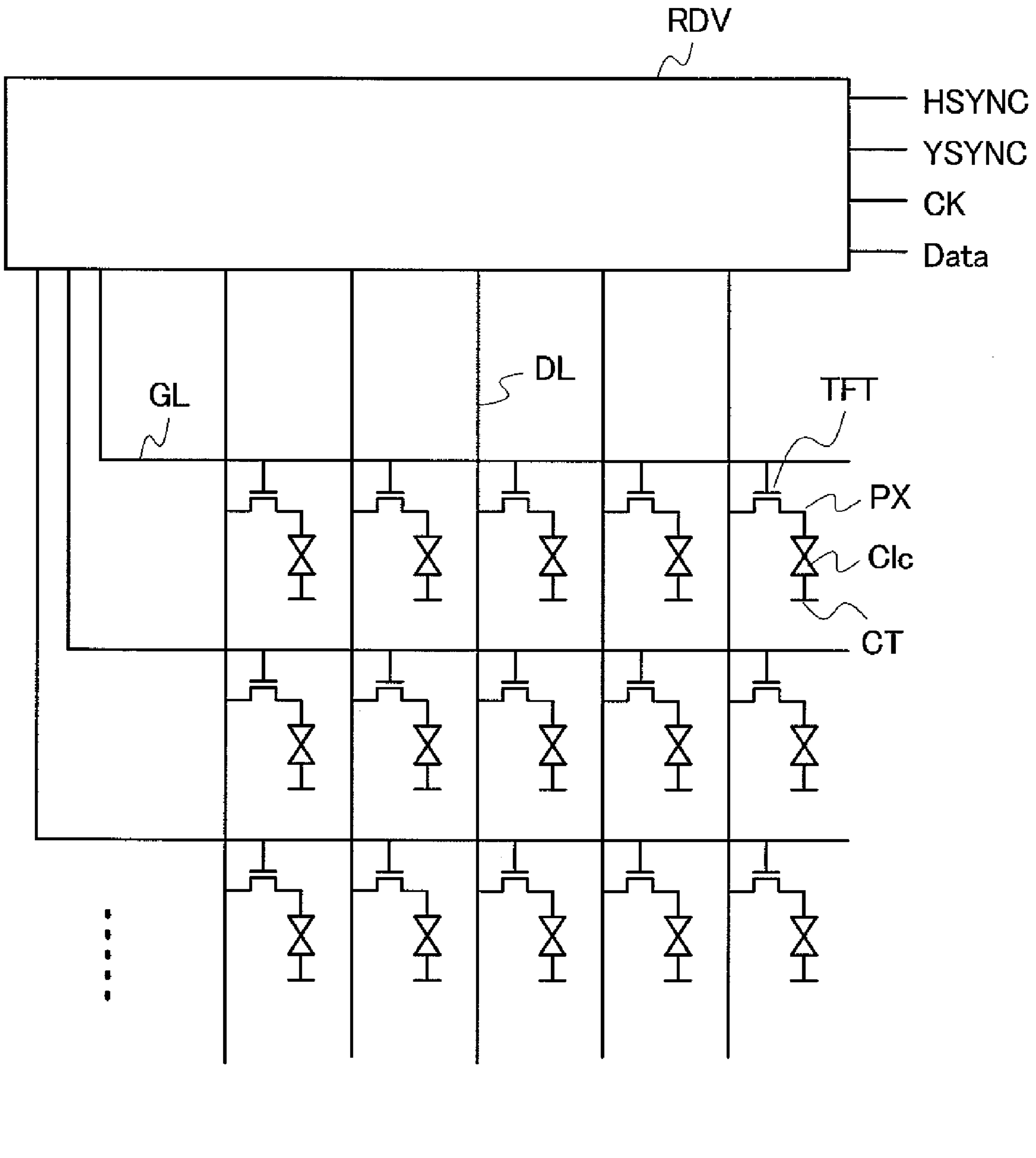
FIG. 2 PRIOR ART
FIG. 2 shows an equivalent circuit of another conventional TFT type active matrix liquid crystal display panel.

Hereinafter, embodiments of the invention will be described in detail with reference to the drawings.

Throughout the drawings for describing the embodiments, parts having the same functions are denoted by the same reference numerals and signs, and the repetitive description thereof is omitted.

First Embodiment

Figure 3:
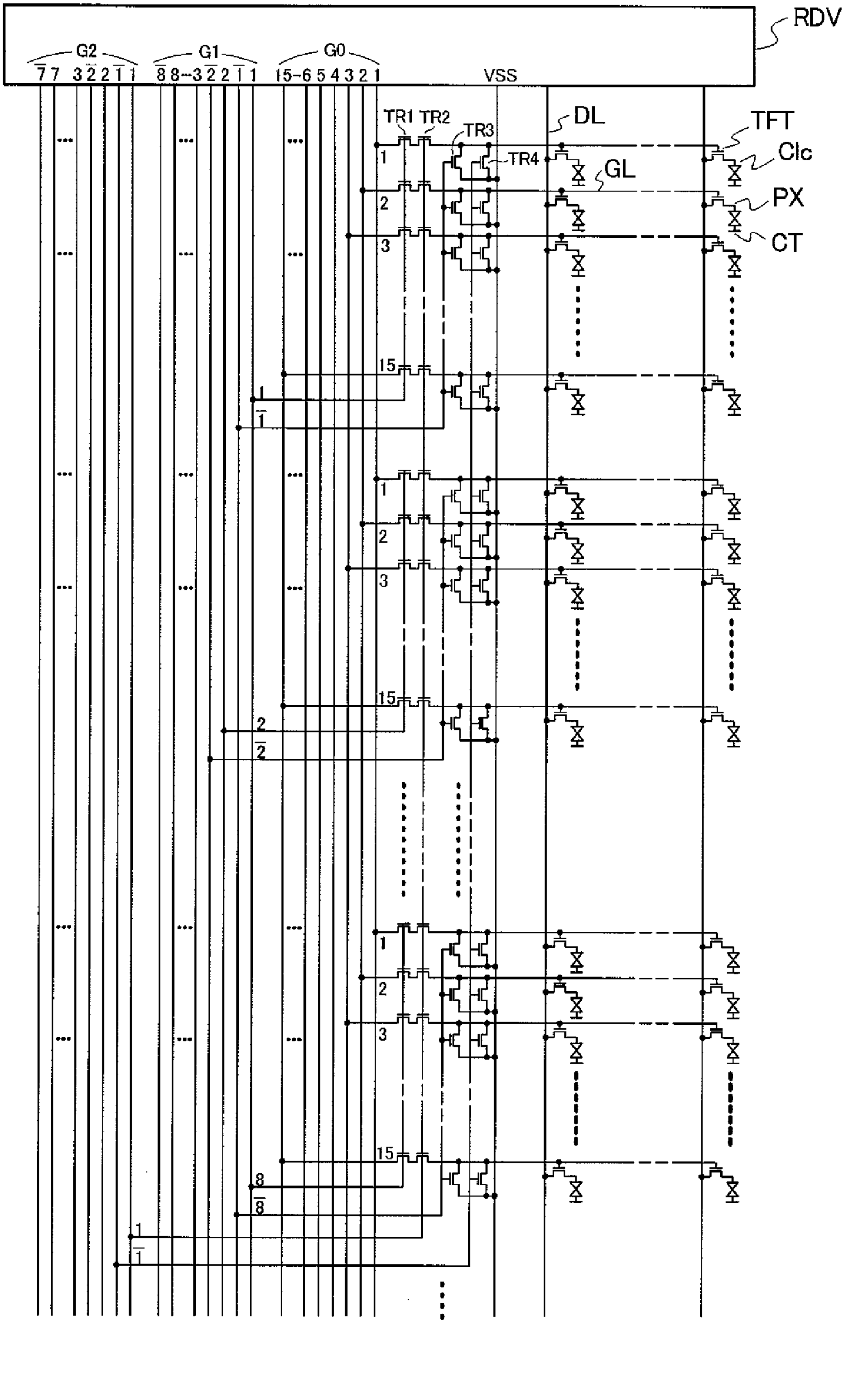
FIG. 3 shows an equivalent circuit of a TFT type active matrix liquid crystal display panel of a first embodiment of the invention.

FIG. 3 shows an equivalent circuit of a TFT type active matrix liquid crystal display panel of a first embodiment of the invention.

As shown in FIG. 3, the liquid crystal display panel of the embodiment includes a plurality of scanning lines (also referred to as gate lines) (GL) arranged in parallel in the y-direction and extending in the x-direction and a plurality of video lines (also referred to as source lines or drain lines) (DL) arranged in parallel in the x-direction and extending in the y-direction on the surface on the liquid crystal side of one of a pair of substrates which are arranged to face each other via liquid crystal.

Regions surrounded by the scanning lines and the video lines constitute sub-pixel regions. In one of the sub-pixel regions, a thin film transistor (TFT) constituting an active element in which a gate thereof is connected to the scanning line, a drain (or source) thereof is connected to the video line, and a source (or drain) thereof is connected to a pixel electrode (PX) is provided.

Since liquid crystal is present between the pixel electrode (PX) and a counter electrode (CT), a liquid crystal capacitor (Clc) is formed between the pixel electrode (PX) and the counter electrode (CT). A holding capacitor (Cadd) is actually formed between the pixel electrode (PX) and the counter electrode (also referred to as common electrode) (CT). In FIG. 3, however, the holding capacitor (Cadd) is not illustrated.

Each of the video lines (DL) is connected to a scanning circuit (RDV) having a horizontal scanning circuit and a vertical scanning circuit incorporated therein. The scanning circuit (RDV) outputs a video voltage of R, G, or B (so-called gray scale voltage) to each of the video lines (DL) during 1 horizontal scanning period.

The liquid crystal display panel of the embodiment is configured as follows: a first substrate (also referred to as TFT substrate or active matrix substrate) (not shown) on which pixel electrodes, thin film transistors, and the like are provided and a second substrate (also referred to as counter substrate) (not shown) on which color filters and the like are formed are overlapped with each other with a predetermined gap; both the substrates are bonded together with a sealing material provided in a frame shape in the vicinity of a peripheral portion between the substrates; liquid crystal is filled from a liquid crystal filling port disposed at a part of the sealing material into an inner space of the sealing material between the substrates and sealed; and further, a polarizer is bonded to the outer surfaces of the substrates.

As described above, in the liquid crystal display panel of the embodiment, liquid crystal is interposed between the pair of substrates. The counter electrode is provided on the second substrate (counter substrate) side in the case of a TN type or VA type liquid crystal display panel. In the case of an IPS type, the counter electrode is provided on the first substrate (TFT substrate) side.

The invention does not directly relate to the internal structure of the liquid crystal display panel, and therefore the detailed description of the internal structure of the liquid crystal display panel is omitted. The invention can be applied to a liquid crystal display panel of any structure.

Hereinafter, the liquid crystal display panel of the embodiment will be described assuming that the number of the scanning lines (GL) is 840.

In the embodiment, the scanning lines (GL) are grouped into k3×k2 groups. The number of the scanning lines (GL) in each of the groups is up to k1.

In FIG. 3, since k2 is 8, and k3 is 7, the scanning lines (GL) are grouped into 56 groups in the embodiment. Further, since k1 is 15, the total number of the scanning lines (GL) is 840(=7×8×15).

Therefore, the scanning circuit (RDV) includes a first group of k1 terminals (G0), a second group of 2×k2 terminals (G1), and a third group of 2×k3 terminals (G2) as terminals for the scanning lines (GL). The second group of terminals (G1) and the third group of terminals (G2) require 2×k2 and 2×k3 terminals in order to output a selection scanning voltage and an inverted selection scanning voltage.

In the embodiment, one end of each of the scanning lines (GL) is connected to a second electrode (drain or source) of a second transistor (TFT2). A first electrode (source or drain) of the second transistor (TFT2) is connected to a second electrode of a first transistor (TFT1).

A third transistor (TFT3) and a fourth transistor (TFT4) are connected between each of the scanning lines (GL) and a reference power source (a voltage VSS whose voltage level is at a Low level (hereinafter referred to as L level), in this case) in order to prevent the scanning line (GL) from being brought into a floating state when a non-selection scanning voltage is supplied to each of the scanning lines (GL).

A gate of the first transistor is connected to any one of gate wirings connected to terminals which output a selection scanning voltage among the second group of terminals (G1). A gate of the third transistor is connected to any one of gate wirings connected to terminals which output an inverted selection scanning voltage of the selection scanning voltage input to the gate of the first transistor among the second group of terminals (G1).

Similarly, a gate of the second transistor is connected to any one of gate wirings connected to terminals which output a selection scanning voltage among the third group of terminals (G2). A gate of the fourth transistor is connected to any one of gate wirings connected to terminals which output an inverted selection scanning voltage of the selection scanning voltage input to the gate electrode of the second transistor among the third group of terminals (G2).

In FIG. 3, the scanning circuit (RDV) may have a circuit configuration including the vertical scanning circuit (XDV) and the horizontal scanning circuit (YDV) disposed separately as shown in FIG. 1.

Figure 4B:
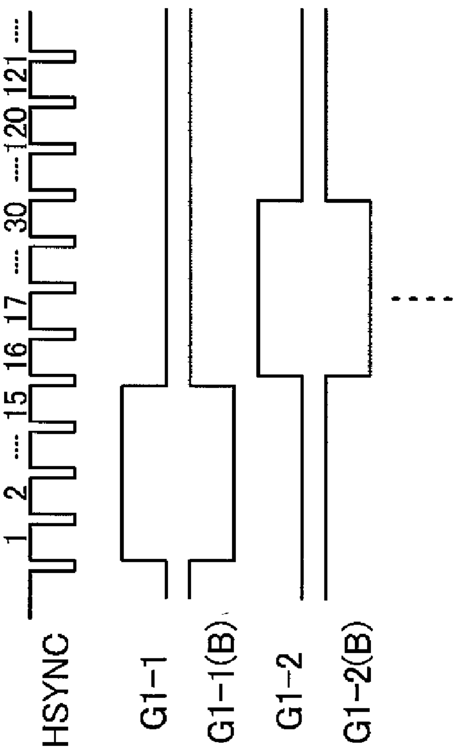
FIGS. 4A to 4C are timing diagrams for describing a method for driving the liquid crystal display panel of the first embodiment of the invention.
Figure 4C:
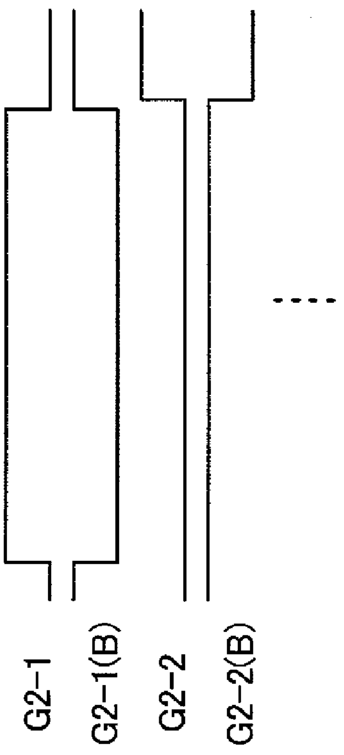
Figure 4A:
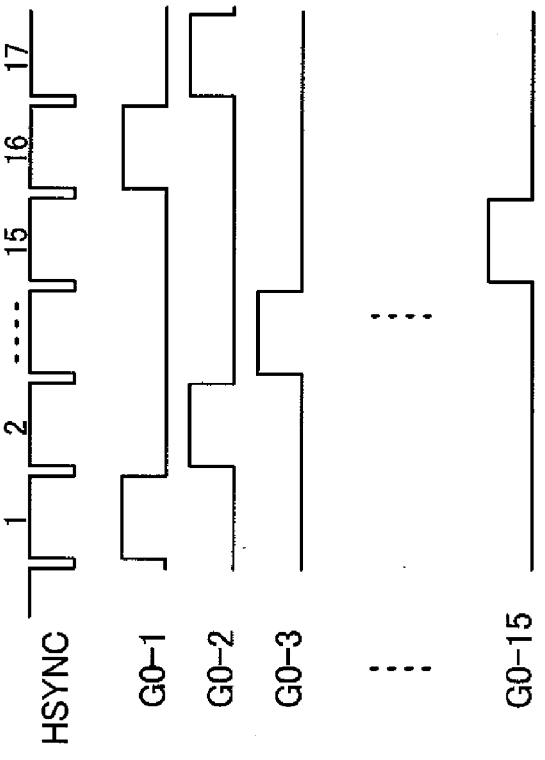

FIGS. 4A to 4C are timing diagrams for describing a method for driving the liquid crystal display panel of the embodiment.

As shown in FIG. 4A, the scanning circuit (RDV) sequentially outputs a selection scanning voltage at a High level (hereinafter referred to as H level) to G0-1 to G0-15 terminals among the first group of terminals (G0) every horizontal scanning period (pentadecimal).

As shown in FIG. 4B, the scanning circuit (RDV) sequentially outputs a selection scanning voltage at the H level to G1-1 to G1-8 terminals among the second group of terminals (G1) every 15 H periods (octal). That is, each of the second group of terminals (G1) sequentially outputs a selection scanning voltage at the H level to a bundle of 15 scanning lines (GL) every 15 H periods.

As shown in FIG. 4C, the scanning circuit (RDV) sequentially outputs a selection scanning voltage at the H level to G2-1 to G2-7 terminals among the third group of terminals (G2) every 120 H periods (=15 H×8) (septenary). That is, each of the third group of terminals (G2) sequentially outputs a selection scanning voltage at the H level to a bundle of 120 scanning lines (GL) every 120 H periods.

When a selection scanning voltage at the H level is output to terminals selected among the second group of terminals (G1) and the third group of terminals (G2), the transistors (TFT1) and the transistors (TFT2) whose gates are connected to the gate wirings connected to the selected terminals are turned on.

Next, when a selection scanning voltage at the H level is output from a terminal selected among the first group of terminals (G0), a thin film transistor (active element) (TFT) whose gate is connected to the scanning line (GL) supplied with the selection scanning voltage is turned on. Therefore, a video voltage is written to a pixel electrode via the thin film transistor (TFT) to display an image on the liquid crystal display panel.

In this case, a non-selection scanning voltage at the L level is output from a terminal corresponding to the selected terminal, among G1-1 (B) to G1-8 (B) terminals of the second group of terminals (G1). Similarly, a non-selection scanning voltage at the L level is output from a terminal corresponding to the selected terminal, among G2-1 (B) to G2-7 (B) terminals of the third group of terminals (G2). In FIG. 3, *(B) is expressed by */(bar) (* is a number).

When the non-selection scanning voltage at the L level is output from the terminals corresponding to the selected terminals, the transistors (TFT3) and the transistors (TFT4) whose gates are connected to the gate wirings connected to the terminals from which the non-selection scanning voltage at the L level is output are turned off.

This makes the transistors (TFT1) and the transistors (TFT2) turned on and the transistors (TFT3) and the transistors (TFT4) turned off, in a group selected among the 56 groups. In the remaining groups, since one of the transistor (TFT3) and the transistor (TFT4) is turned on, the scanning line (GL) is at the L level (=VSS). In this manner, the scanning lines (GL) are sequentially selected in the embodiment.

In the embodiment, when the numbers of the first group of terminals (G0), the second group of terminals (G1), and the third group of terminals (G2) are equal, the number of gate wirings which connect the first group of terminals (G0), the second group of terminals (G1), and the third group of terminals (G2) with the scanning lines (GL) is minimized, with respect to the total number of 840 scanning lines.

In the embodiment, the numbers of the gate wirings which connect the first group of terminals (G0), the second group of terminals (G1), and the third group of terminals (G2) with the scanning lines (GL) are respectively 15, 16 (8×2), and 14 (7×2), which are substantially equal to one another. In this case, the total number of gate wirings is minimized (45 in total=15+16+14). That is, when gate wirings are wired from the scanning circuit (RDV) to all the scanning lines (GL) in one-to-one correspondence, 840 gate wirings are required. However, the number of the gate wirings can be reduced to 45.

The embodiment has described the case where the scanning lines (GL) are driven in a three-stage configuration. However, the scanning lines (GL) can be driven in a four- or more-stage configuration.

In addition, the total number of gate wirings is close to the minimum in the case where the difference between a maximum number and a minimum number among the number of terminals in each of stages is 3 or less when the number of the stages of the scanning circuit (RDV) is N, and the number of terminals in each of the stages is kn ($1 \leqq n \leqq N$).

Second Embodiment

Figure 5:
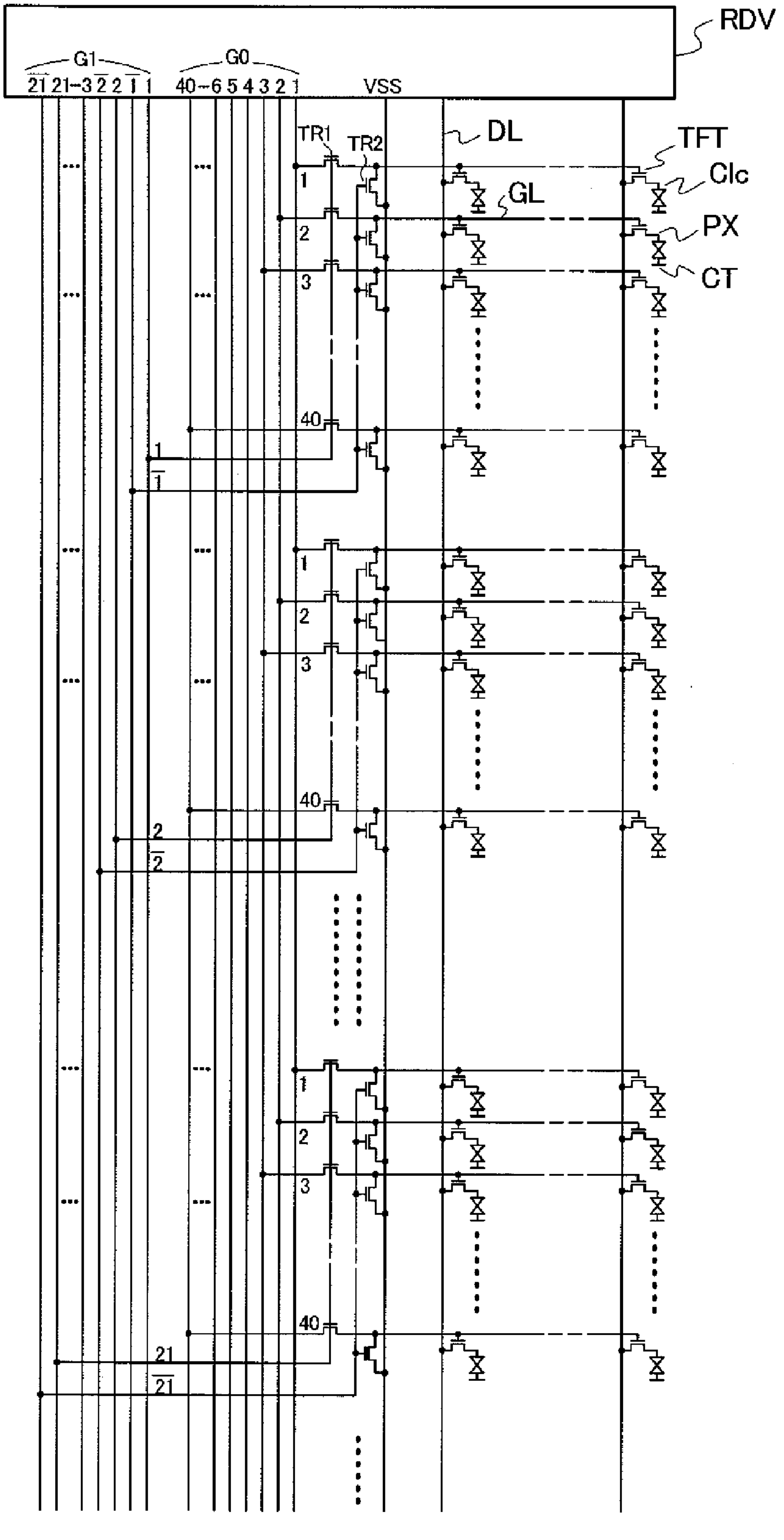
FIG. 5 shows an equivalent circuit of a TFT type active matrix liquid crystal display panel of a second embodiment of the invention.

FIG. 5 shows an equivalent circuit of a TFT type active matrix liquid crystal display panel of a second embodiment of the invention.

The embodiment is an embodiment in which the scanning lines (GL) are driven in a two-stage configuration. In the embodiment, therefore, the transistor (TFT3) and the transistor (TFT4) are omitted compared with the above-described embodiment shown in FIG. 3.

Since the number of the first group of terminals (G0) and the number of the second group of terminals (G1) of the scanning circuit (RDV) are 40 and 42 (2×21), respectively, the total number of gate wirings is 82 (=40+42).

That is, the number of transistors is reduced from 4 to 2 for each scanning line in the embodiment. Instead, the number of gate wirings is about doubled (from 45 to 82).

In this manner, the number of transistors and the number of gate wirings are in the relationship of trade-off. Like the case of a liquid crystal display panel using an a-Si thin film transistor as an active element, when performance necessary for rising or falling of the scanning line (GL) is not offered unless the size of the transistor is increased, the embodiment is effective because the number of transistors can be decreased, and therefore the total area can be reduced even though the number of gate wirings is increased.

Third Embodiment

Figure 6:
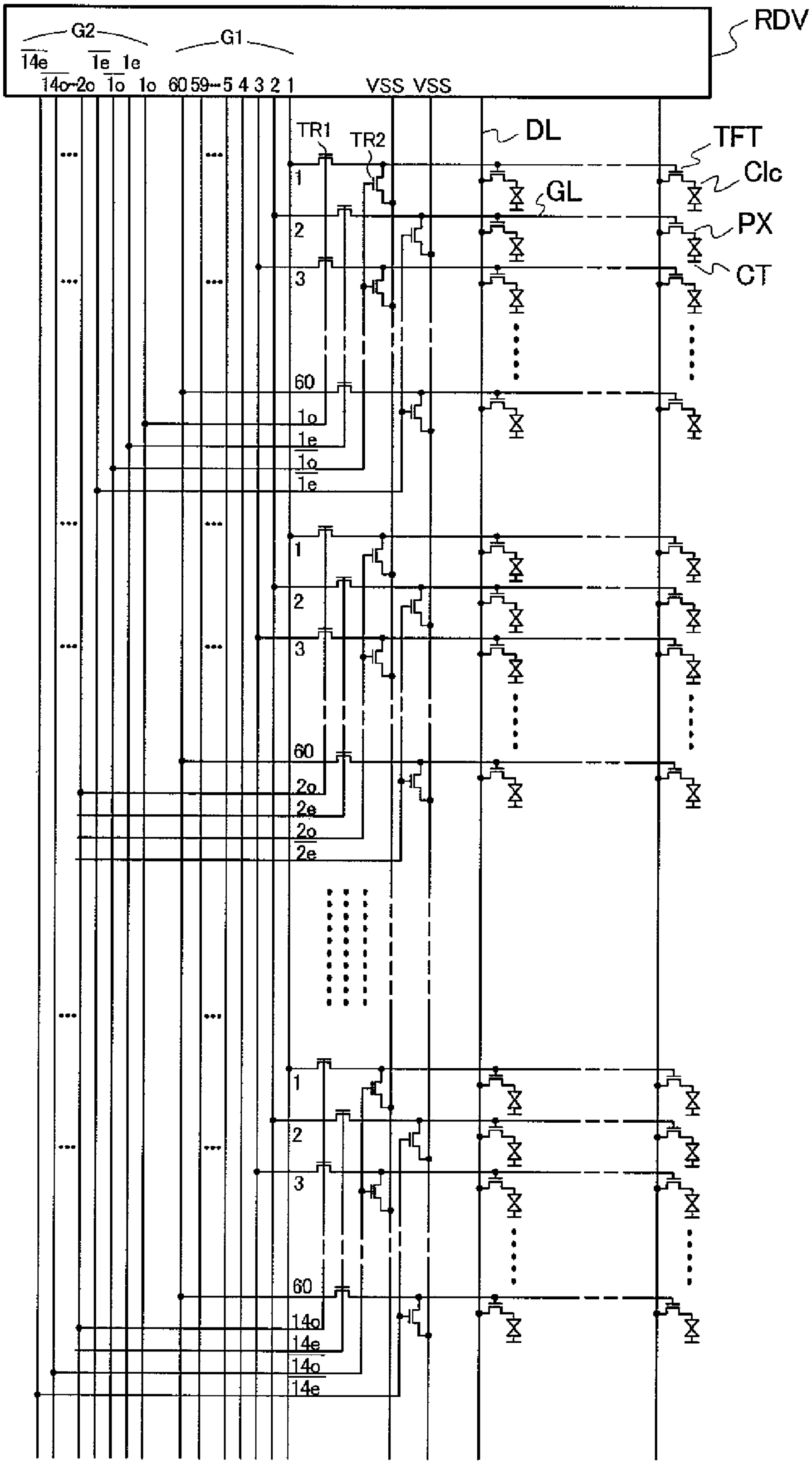
FIG. 6 shows an equivalent circuit of a TFT type active matrix liquid crystal display panel of a third embodiment of the invention.

FIG. 6 shows an equivalent circuit of a TFT type active matrix liquid crystal display panel of a third embodiment of the invention.

The embodiment is an embodiment in the case of a two-line simultaneous and alternating drive in the above-described embodiment. The embodiment is effective when the performance necessary for rising or falling of the scanning line (GL) is not offered even if the two-stage configuration is employed like the second embodiment.

Figure 7B:
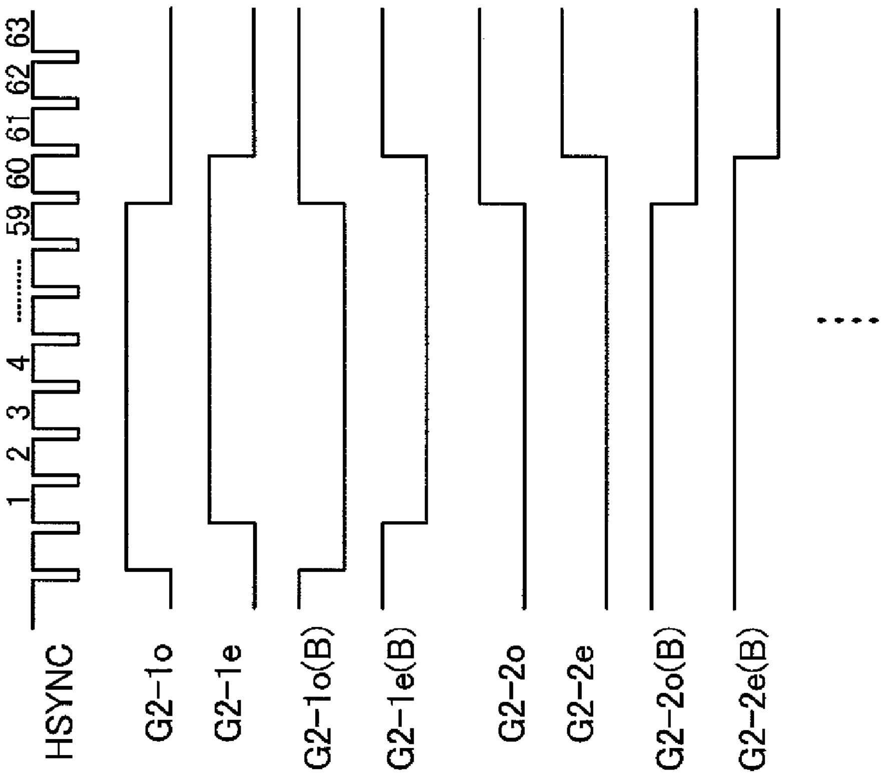
FIGS. 7A and 7B are timing diagrams for describing a method for driving the liquid crystal display panel of the third embodiment of the invention.
Figure 7A:
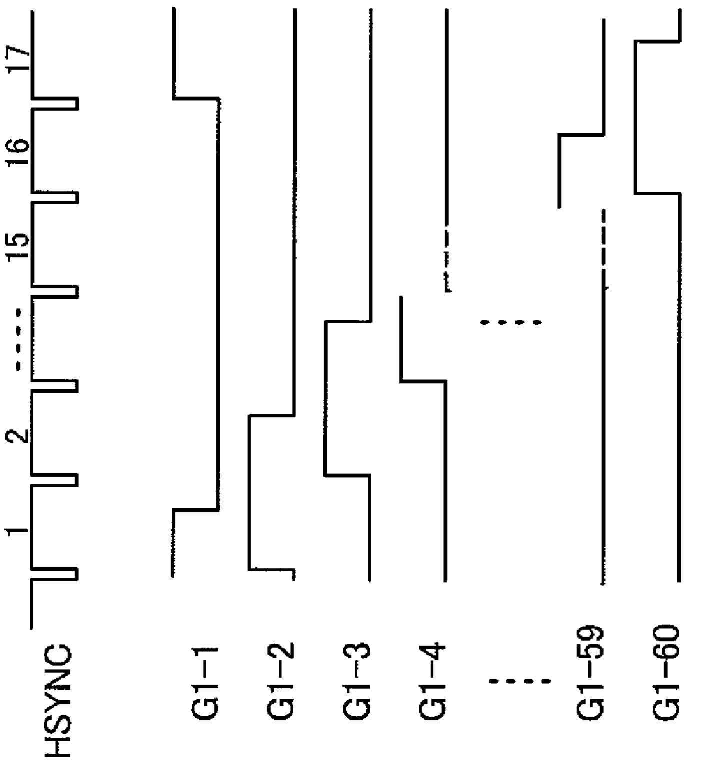

FIGS. 7A and 7B are timing diagrams for describing a method for driving the liquid crystal display panel of the embodiment.

As shown in FIGS. 7A and 7B, the scanning line (GL) rises 1 H period earlier in the embodiment. This makes it possible to provide a time margin for driving.

Although the above-described embodiment has described the case where the vertical scanning circuit is driven in a multiple stage configuration, the horizontal scanning circuit can also be driven in a multiple stage configuration.

Figure 8:
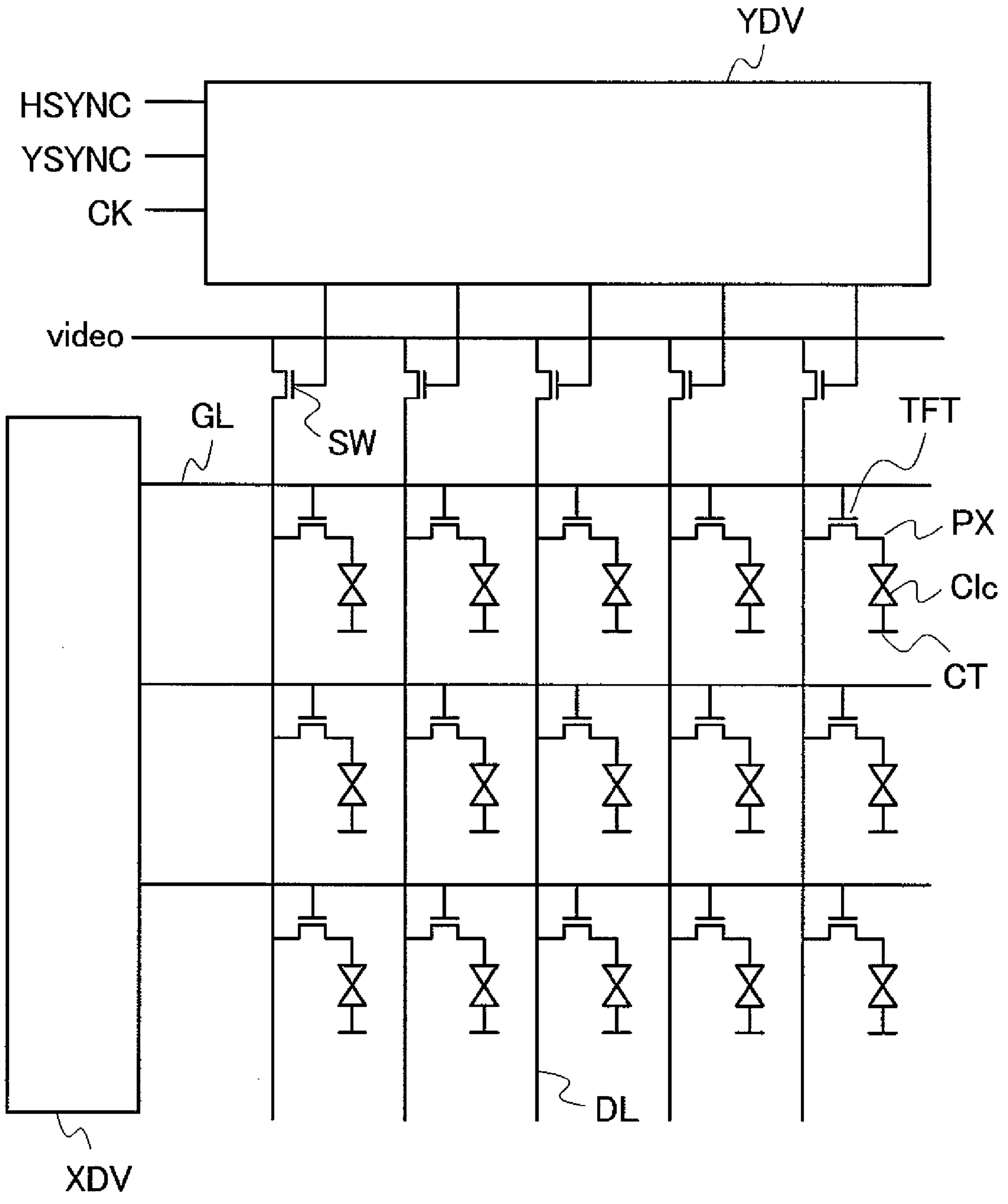
FIG. 8 PRIOR ART
FIG. 8 shows an equivalent circuit of still another conventional TFT type active matrix liquid crystal display panel.

FIG. 8 shows an equivalent circuit of still another conventional TFT type active matrix liquid crystal display panel.

In the liquid crystal display panel shown in FIG. 8, the video lines (DL) are connected to a video signal line (video) via switching elements (SW). The switching elements (SW) are sequentially turned on by the horizontal scanning circuit (YDV) in synchronization with a dot clock (CK) to supply a video voltage on the video signal line (video) to the video line (DL).

The horizontal scanning circuit (YDV) shown in FIG. 8 can employ the circuit configuration of the multiple stage configuration described in each of the above-described embodiments.

When the horizontal scanning circuit (YDV) shown in FIG. 8 employs the circuit configuration of the multiple stage configuration described in each of the above-described embodiments, the dot clock (CK) has to be used instead of 1 H period.

For example, when the horizontal scanning circuit (YDV) shown in FIG. 8 employs the circuit configuration of the three-stage configuration shown in FIG. 3, the horizontal scanning circuit (YDV) sequentially outputs a selection scanning voltage at the H level to the G0-1 to G0-15 terminals among the first group of terminals (G0) every dot clock (CK).

The horizontal scanning circuit (YDV) sequentially outputs a selection scanning voltage at the H level to the G1-1 to G1-8 terminals among the second group of terminals (G1) every 15 dot clocks (CK).

The horizontal scanning circuit (YDV) sequentially outputs a selection scanning voltage at the H level to the G2-1 to G2-7 terminals among the third group of terminals (G2) every 120 dot clocks (CK).

As described above, the number of gate wirings which connect the scanning circuit with the scanning lines (GL) can be decreased in the embodiment.

While the invention made by the inventor has been described so far based on the embodiments, it is apparent that the invention is not limited to the embodiments but can be modified variously without departing from the gist thereof.

What is claimed is:

1. A display device comprising:
a plurality of pixels;
a plurality of scanning lines which input a scanning voltage to the plurality of pixels; and
a scanning line drive circuit which supplies the plurality of scanning lines with the scanning voltage, wherein
the scanning lines are grouped into kN× . . . ×k2 groups, k being an integer of at least 1, N being an integer of 2 or more,
the number of the scanning lines in each of the groups is up to k1,
first to Nth groups of gate wirings are included, each of the first to Nth groups being composed of kn (1≦n≦N) gate wirings, and
the scanning line drive circuit outputs a first selection scanning voltage which selects the scanning lines in each of the groups every horizontal scanning period to the first group of k1 gate wirings,
outputs a second selection scanning voltage which selects the scanning lines in one of groups in a second stage where k2 groups constitute one unit every k1 horizontal scanning periods to the second group of k2 gate wirings, and
outputs an mth selection scanning voltage which selects the scanning lines in one of groups in an mth stage where k(m−1) groups in a (m−1)th stage constitute one unit every (k(m−1)× . . . ×k1) horizontal scanning periods to an mth group of km gate wirings, m being an integer of 3 or more and N or less (3≦m≦N).

2. The display device according to claim 1, further comprising a series circuit of (N−1) first to (N−1)th transistors, wherein
one end of each of the scanning lines is connected to a second electrode of the (N−1)th transistor,
a first electrode of the first transistor is connected to any one of the first group of gate wirings, and
a control electrode of the j (1≦j≦N−1)th transistor is connected to any one of the (j+1)th group of gate wirings.

3. The display device according to claim 2, further comprising (N−1) Nth to (2N−2)th transistors each of which is connected between each of the scanning lines and a reference power source, wherein
each of the second group of gate wirings to the Nth group of gate wirings includes kp (2≦p≦N) inverted gate wirings,
the scanning line drive circuit outputs a pth inverted selection scanning voltage to a corresponding inverted gate wiring when outputting the pth selection scanning voltage, and
a control electrode of the i (N≦i≦2N−2)th transistor is connected to any one of the (i+1)th group of inverted gate wirings.

4. The display device according to claim 3, wherein
a difference between a maximum number and a minimum number in k1 and 2kp (2≦p≦N) is 3 or less.

5. A display device comprising:
a plurality of pixels;
a plurality of video lines which input a video voltage to the plurality of pixels; and
a video line drive circuit which supplies the plurality of video lines with the video voltage, wherein
the video lines are grouped into kN× . . . ×k2 groups, k being an integer of at least 1, N being an integer of 2 or more,
the number of the video lines in each of the groups is up to k1,
first to Nth groups of source wirings are included, each of the first to Nth groups being composed of kn (1≦n≦N) source wirings,
the video line drive circuit outputs a first selection scanning voltage which selects the video lines in each of the groups every dot clock to the first group of k1 source wirings,
outputs a second selection scanning voltage which selects the video lines in one of groups in a second stage where k2 groups constitute one unit every k1 dot clocks to the second group of k2 source wirings, and
outputs an mth selection scanning voltage which selects the video lines in one of group in an mth stage where k(m−1) groups in a (m−1)th stage constitute one unit every (k(m−1)× . . . ×k1) dot clocks to an mth group of km source wirings, m being an integer of 3 or more and N or less (3≦m≦N).

6. The display device according to claim 5, wherein
one end of each of the video lines is supplied with a video voltage via a switching transistor,
a series circuit of (N−1) first to (N−1)th transistors is included,
a control electrode of each of the switching transistors is connected to a second electrode of the (N−1)th transistor,
a first electrode of the first transistor is connected to any one of the first group of source wirings, and
a control electrode of the j (1≦j≦N−1)th transistor is connected to any one of the (j+1)th group of source wirings.

7. The display device according to claim 6, further comprising (N−1) Nth to (2N−2)th transistors each of which is connected between the control electrode of each of the switching transistors and a reference power source, wherein
each of the second group of source wirings to Nth group of source wirings includes kp (2≦p≦N) inverted source wirings,
the video line drive circuit outputs a pth inverted selection video voltage to a corresponding inverted source wiring when outputting the pth selection video voltage, and
a control electrode of the i (N≦i≦2N−2)th transistor is connected to any one of the (i+1)th group of inverted source wirings.

8. The display device according to claim 7, wherein
a difference between a maximum number and a minimum number in k1 and 2kp (2≦p≦N) is 3 or less.

* * * * *